Patented May 5, 1942

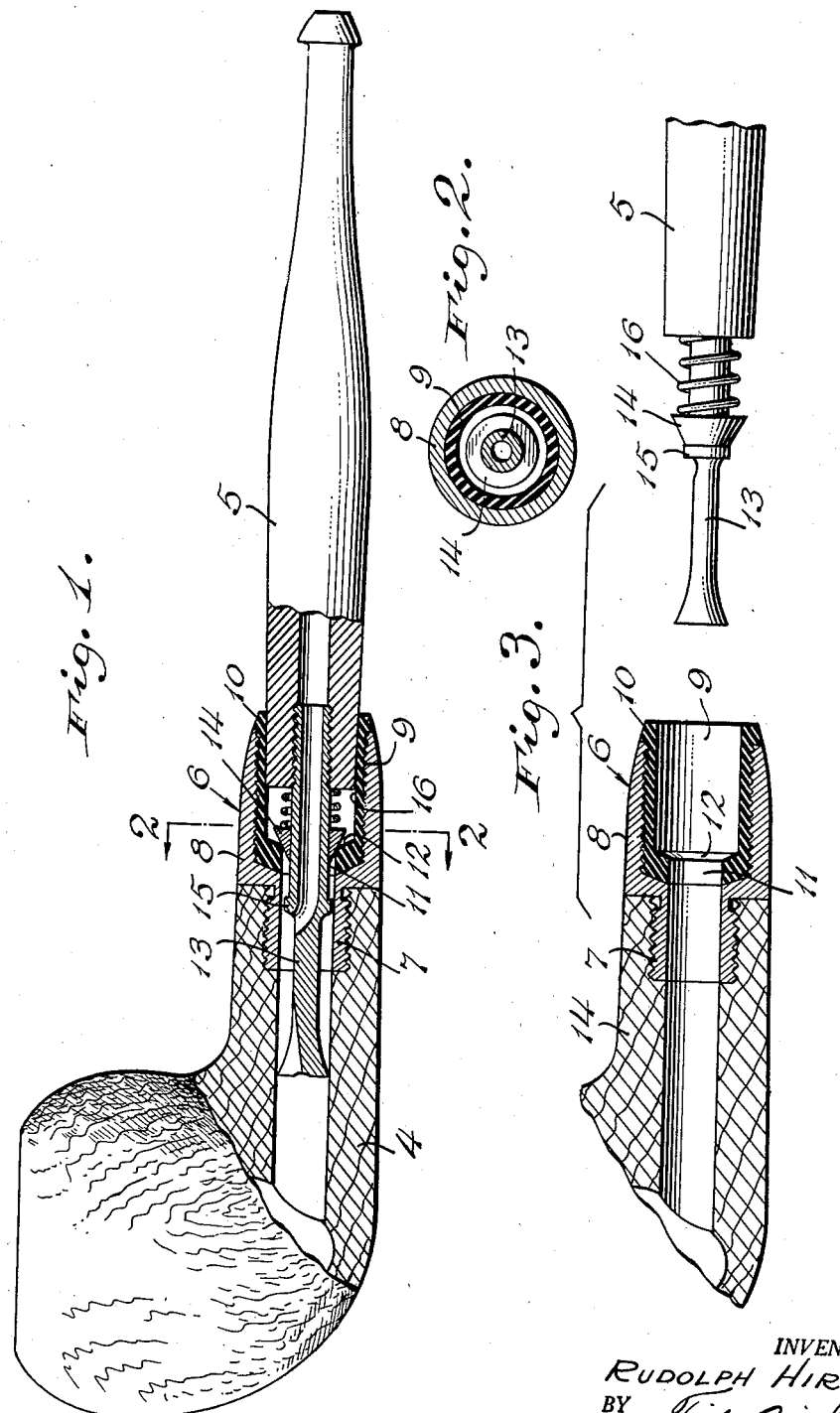

2,282,055

UNITED STATES PATENT OFFICE 2,282,055

SMOKING PIPE

Rudolph Hirsch, North Bergen, N. J.

Application October 19, 1939, Serial No. 300,179

4 Claims. (Cl. 131—225)

This invention relates to improvements in smoking pipes and has for one of its objects to provide an improved pipe of simple and practical construction wherein a mounting for joining the mouthpiece of the pipe with the stem thereof will effectively prevent the escape of moisture around the portion of said mouthpiece which is inserted into said mounting.

A further object of my invention relates to a strong, simple and effective mounting for joining the mouthpiece and the stem of a smoking pipe whereby union or separation of said parts may be effected by a simple axial movement and without rotation.

It is the general object of my invention to provide in a smoking pipe a simple practical effective and inexpensive construction.

The above and other objects will appear more clearly from the following detailed description when taken in connection with the accompanying drawing which illustrates a preferred embodiment of the inventive idea.

In the drawing:

Figure 1 is a side elevation partly broken away and shown in section of a smoking pipe constructed in accordance with the invention.

Figure 2 is a section on the line 2—2 of Figure 1, and

Figure 3 is a fragmentary exploded view partly in elevation and partly in section of the stem and mouthpiece of the pipe.

Referring more particularly to the accompanying drawing the numeral 4 indicates the wooden stem of a smoking pipe and 5 the mouthpiece or bit thereof.

In accordance with the present invention a mounting is provided for the mouthpiece 5 which will prevent the escape of moisture from the bowl and stem of the pipe around that portion of the mouthpiece which fits into said mounting. To this end, the mounting comprises a unitary metallic fitting, generally indicated by the numeral 6, which consists of an externally threaded nipple 7 adapted to be threaded into the bore of the stem 4 for securing the fitting to said stem. A portion 8 formed integrally with the nipple 7 of the fitting is adapted to abut the adjacent end of the wooden stem 4 and is of the same exterior diameter as said stem so as to form in effect, a continuation thereof.

Within the portion 8 of the fitting 6 there is mounted a non-metallic socket member 9 which may be made of Bakelite or similar substance. This socket member constitutes an inner liner for the portion 8 of the fitting and may be screw threaded into the same and cemented in place so as to form an integral part of the fitting. The outer end of the socket member is flanged as indicated at 10 for engagement with the outer extremity of the portion 8 and, at its inner end, is provided with an opening 11 surrounded by a valve seat 12, said opening establishing communication between the bore of the stem 4 and the interior of the socket member 9. An extension 13 of the mouthpiece 5 projects through the opening 11 and into the bore of the stem 4 when the inner end of the mouthpiece is fitted into the outer end of the socket member 9. Said extension is of smaller diameter than the opening 11 and of the portion of the nipple 7 through which it extends and, consequently, it may be possible for moisture from the bowl of the pipe to flow around said extension and into the cavity formed by the socket or liner member 9. To avoid such flow, there may be provided a valve 14 which is slidably mounted upon the extension 13 between the inner end of the mouthpiece 5 and a flange 15 formed on said extension. A coil spring 16 is interposed between said mouthpiece and the valve 14 so as to force the latter in the direction of the flange 15. However, when the extension 13 is projected into the bore of the stem 4 and the mouthpiece 5 is fitted into the socket member 9, the valve 14 will engage the seat 12 of said socket member and since the flange 15 is projected beyond said valve seat, the spring 16 will be compressed so as to exert a constant pressure upon the valve 14 so as to retain it in engagement with the seat 12 to effectively close the opening 11. In this manner, moisture from the pipe stem will be prevented from entering the closure member 9 through its opening 11 and consequently leakage of such moisture outwardly between the mouthpiece 5 and the socket member will be avoided.

With the aid of the foregoing description the advantages of my improved construction will be readily understood.

The mouthpiece 5 is held in place by friction between its end portion and the entrance portions of the socket 9, and for this purpose these parts are shown slightly conically tapered, whereby the mouthpiece 5 will be wedged in place in the socket. The use of material such as Bakelite or similar material for the socket 9 will be found of advantage because of the frictional effects, which are better than where metal is used for this portion. Bakelite or the like also insures freedom from corrosion. Since, however, Bakelite and similar materials lack the necessary strength to resist the wedging action of the mouthpiece 5, the socket 9 is surrounded by the metal fitting 6, which is permanently set into the wooden stem 4 at a place remote from the joint, so that the parts thereof will not be affected by warping, shrinking, expansion, cracking or other deformations and changes in the wood due to the action thereon of heat, moisture, pressure and other influences.

Since the interfit between the mouthpiece 5 and the socket 9 cannot be depended upon as being leak proof, I have guarded against the possibility of leakage by the valve closure at the point where the extension 13 passes into the nicotine collecting chamber surrounding the inner portions of the extension 13. This closure, it will be seen, is of a type that will be effective through a wide range of variation in the relative positions of the interfitting parts of the mouthpiece and the socket 9, so that the necessity for close limits of tolerance in the manufacture of these parts, and consequently increased cost thereof, will be avoided. Furthermore, changes in the relative position of the said interfitting parts due to deformations thereof, or to the collection of foreign matter in the surfaces thereof, will not affect the effectiveness of the valve 14.

The advantages of the collar 15 in holding the valve in assembled relation to the mouthpiece when the latter is separated from the stem will be readily understood. So will the advantages of the enlarged head portion on the inner end of the extension 13, which serves to center the parts while the mouthpiece 5 is inserted into place in the socket 9.

It will be understood that I have herein disclosed only one illustrative embodiment of my invention and that my invention may be embodied in many other forms without departing from the spirit thereof.

What is claimed is:

1. In a smoking pipe, a stem including a fitting carried at one end thereof and having a cavity, a socket member forming a lining for said cavity and having a valve seat, a mouthpiece insertible into said socket member and seating therein, and a valve supported by said mouthpiece for engagement with said valve seat.

2. In a smoking pipe, a stem including a fitting carried at one end thereof and having a cavity, a socket member forming a lining for said cavity and having a valve seat, a mouthpiece insertible into said socket member and seating therein, and having an extension projecting through said valve seat and into the bore of said stem, and a spring pressed valve on said extension engageable with said seat to close the same.

3. In a pipe, a hollow stem, a hollow metallic member threaded into said stem so as to form a continuation thereof, a lining of Bakelite seated in said member so as to form a lining therefor, said member and liner being provided with alined bores in alignment with and forming a continuation of the bore of said stem, said liner having a slightly tapered entrance portion, a tubular mouthpiece tapered externally so as to fit into said tapered entrance portion, an extension on said mouthpiece adapted to fit into the bore of said stem, said extension being of less diameter than the bore of said stem except at its end portion which is enlarged, whereby an annular chamber is formed in the stem, a passage for vapors in said enlarged end, and a passage in said extension communicating at one end with said annular chamber and at its other end with the bore of the mouthpiece, an annular valve seat in said liner around the bore thereof, an annular valve slidable on said extension and adapted to seat on said valve seat, means for urging said valve onto said seat whenever said mouthpiece is seated in said liner, and stop means to limit the movement of said valve on said extension when said mouthpiece is separated from the stem.

4. In a pipe a mouthpiece, a stem provided with a bore, a socket carried by said stem, said socket having a slightly conically tapered bore at its entrance portion and having an opening communicating with the bore in the stem, said mouthpiece having a slightly conically tapered end portion adapted to seat in the entrance portion of said socket and to be retained therein by friction, a tubular extension carried by the mouthpiece and extending into the bore of said stem through the opening in the socket when the mouthpiece is seated in the socket, and valve means for closing the opening in said socket at the point where the extension passes through it, whenever the mouthpiece is seated in the socket so as to prevent leakage from the bore of said stem into the socket.

RUDOLPH HIRSCH.